April 12, 1938.   G. H. ACKER   2,113,868
REDUCTION GEAR
Filed May 28, 1936
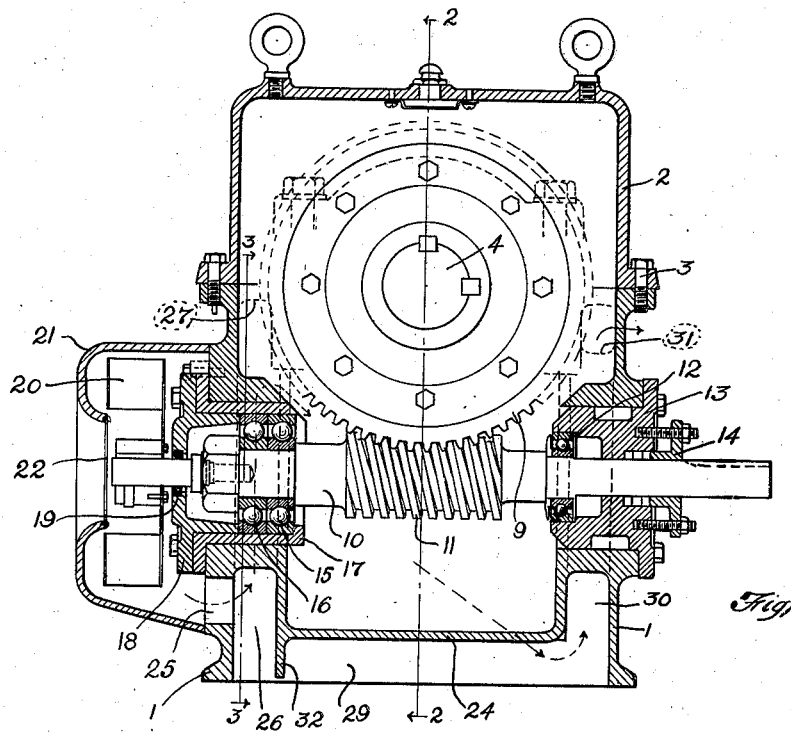
Fig. 1
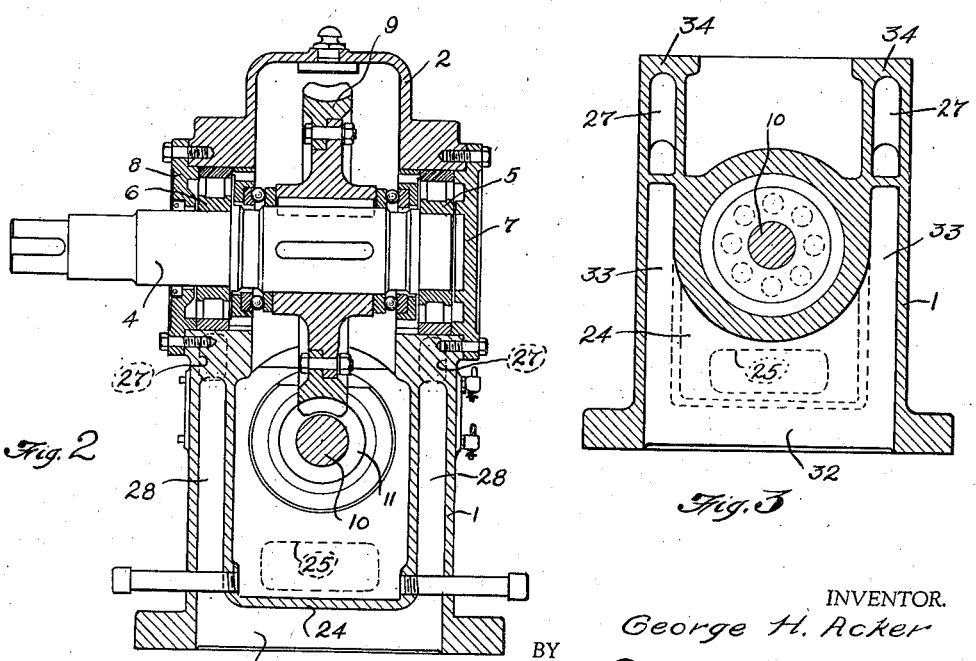
Fig. 2
Fig. 3
INVENTOR.
George H. Acker
BY Ray, Oberlin & Ray
ATTORNEYS.

Patented Apr. 12, 1938

2,113,868

UNITED STATES PATENT OFFICE 2,113,868

REDUCTION GEAR

George H. Acker, Shaker Heights, Ohio, assignor to The Cleveland Worm and Gear Company, Cleveland, Ohio, a corporation of Ohio Application May 28, 1936, Serial No. 82,248

3 Claims. (Cl. 74—606)

The present invention relates to a novel and improved construction for a reduction gear unit, and particularly a worm gear type of unit wherein power is transmitted from a high speed worm shaft and worm to a low speed worm gear and shaft. The general object and nature of the invention is to provide a construction wherein the operating temperature of the reduction gear unit is reduced and maintained at a minimum by means of the circulation of a cooling medium such as air. The invention also provides for a construction wherein that part of the housing or casing surrounding the moving gears, shafts and bearings is separated, except at the shaft bearing supports, from another portion of the housing which supports the weight of and the forces exerted upon the reduction unit. That is to say, I provide a separate, inner housing member which serves as a lubricant reservoir and is spaced from the outer housing which supports the unit. An air circulating means such as a fan is mounted on the end of the high speed worm shaft and forces cooling air into the space between the inner and outer housings whereby the reservoir containing the relatively hot lubricant is not only separate and insulated from the outer supporting housing, but also has its temperature reduced by virtue of the circulation of cooling air.

By reason of this improved construction, the essential advantages are first, that a greater amount of power can be transmitted through the reduction gear unit due to the decrease in the operative temperature, and, second, the gear unit supporting housing is kept free from any substantial amount of expansion due to changes in operating temperatures of the unit, whereby proper alignment of shafts and couplings connected to the unit is maintained. These advantages, and others in addition, will become apparent in greater detail as the following description proceeds.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a sectioned elevational view of the reduction gear unit embodying the principle of my invention; Fig. 2 is a sectional view taken upon a plane normal to that of Fig. 1 and substantially along line 2—2 thereof; Fig. 3 is a sectional view of one end portion of the lower housing member of the unit, taken on a plane normal to that of Fig. 1 and substantially along line 3—3 thereof.

Now referring more particularly to the drawing, the device shown therein consists of a lower supporting housing or casing 1 and an upper cover or housing 2 secured to the first-named housing by means of suitable studs 3. A worm gear shaft 4 is journalled in the radial bearings 5 and 6 which in turn are held in place in the housing portions 1 and 2 by means of the retaining plates 7 and 8 respectively. A worm gear 9 is carried by the worm gear shaft 4. A high speed, worm shaft 10 having an integral worm 11 thereon is journalled at one end in the radial bearing 12. The bearing 12 is supported by a sleeve 13 carried by the lower housing 1. A packing gland 14 seals the worm shaft 10 in the supporting sleeve 13.

The left hand end of the worm shaft 10 is journalled in the thrust bearings 15 and 16 which in turn are supported in the flanged sleeve 17. The thrust bearings 15 and 16 are retained in the supporting sleeve 17 by means of the clamping plate 18. The left hand end of the worm shaft 10 is of reduced diameter and extends through the cartridge type leather oil seal 19 in the clamping plate 18. A centrifugal or impeller type fan 20 is mounted on the extending end portion of the worm shaft 10. A housing 21 surrounds the fan 20 and has a central screened air inlet 22. It is here to be understood that a propeller type fan may equally well be used in lieu of the centrifugal type fan 20.

An inner housing 24 has its side, end and bottom walls spaced from the outer housing 1 and is adapted to serve as a lubricant reservoir. A rectangular opening 24 is located in the wall of the housing 1 adjacent the fan 21. A passage or space 26 between the end walls of the housings 1 and 24 leads around the bearings 15 and 16 to the passages 27 in the upper portion of the lower housing 1. The passages 27 in turn communicate with the spaces or passages 28 between the side walls of the housings 1 and 24. A third space or passage 30 is located between the right hand end walls of the housings 1 and 24 and leads from the said spaces 28 and from the bottom space 29, around the bearing 12 to the exhaust or outlet passages 31 in the right hand upper portion of the lower housing 1.

The arrows in Fig. 1 substantially indicate the path of travel of the cooling air which is circulated past the bearings of the worm shaft 10 and through the spaces between the inner and outer housings 1 and 24. This path of travel is as follows:—From the fan 20 through opening 25, upwardly through space 26, around the bearings 15 and 16 to the passages 27, downwardly from the passages 27 to the side spaces 28 and the bottom space 29, upwardly through the space 30 around the bearing 12 and out to the atmosphere through the outlets 31.

An extension of the left hand end wall of the inner housing 24, as indicated at 32, serves as a baffle for directing substantially the entire air stream upwardly around the bearings 15 and 16, and thus over a longer path of travel. Lateral extensions 33 of the left hand end wall of the housing 24 serve a similar function. The extensions 32 and 33 may be omitted without departing from the scope of the invention, since in such latter case, the majority of the cooling air stream will not be deflected upwardly but will pass directly along the side walls of the inner and outer housings 1 and 24. Omission of the extensions 32 and 33 also serves to better separate and insulate the inner housing 24 from the outer supporting housing 1. It will thus be seen that in the above-described construction that the outer housing 1 supports the weight and all other stresses applied to the reduction gear unit and is substantially separated and insulated by a cooling stream of air from the inner housing 24 which contains the relatively hot lubricant. The inner housing 24 is thus insulated by a fluid-cooled space on substantially five sides from the outer housing 1 and is connected thereto only through the bearing support bosses for the shafts 4 and 10, and by a common flange 34 (as shown in Fig. 3) in the horizontal plane of the low speed shaft 4. In practice, it is customary to operate worm gear reduction units at a temperature of about 90° Fahrenheit above the ambient temperature, or the temperature of the surrounding atmosphere. This temperature rise of course is produced by the mechanical heat imparted from the bearings and the gears and the agitation of the lubricant. Reduction of this temperature rise and the circulation of the cooling medium permits a greater power rating and a greater amount of power to be transmitted through the unit. The heat generated between the moving parts of the reduction unit is first transmitted to the lubricant and then to the housing walls, where, with a 90° temperature rise, a linear expansion of .0005" per inch is produced in the wall, where cast iron is employed as a wall material. Thus, for example, if the center line of the worm gear shaft 4 is 24 inches from the base of the unit, a 90° temperature rise will expand this distance to 24.012 inches with the result that the shaft will be thrown out of alignment and a hazardous stress placed upon any coupling connecting the worm gear shaft to the shaft of another driven machine.

But since the worm gear shaft 4 in the above described construction is supported with respect to the base of the unit by the housing 1 which is spaced from and insulated by a stream of cooling air from the relatively hotter inner housing 24 and lubricant contained therein, such expansion will be substantially prevented and any hazardous misalignment of the worm shaft avoided.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a gear reduction unit, a double walled casing having a fluid tight chamber between the walls thereof and comprising an outer wall designed to support the gearing and a depending inner wall detached from said outer wall except at the top thereof and designed to partially house the gearing and to contain lubricant, and means for circulating a cooling medium between said walls.

2. In a gear reduction unit, a double walled casing having a fluid tight chamber between the walls thereof and comprising an outer wall designed to support the gearing, and a depending inner wall connected to said outer wall at the points of support of said gearing, said inner wall partially enclosing said gearing and adapted to contain lubricant, and means for circulating a cooling medium between said walls.

3. In a worm gear reduction unit, a worm shaft, a worm gear shaft, a double walled casing having a fluid tight chamber between the walls thereof and comprising an outer wall designed to support said shafts, a depending inner wall detached from said outer wall except at the points of support of said shafts, said inner wall being designed to partially enclose the gears on said shafts and to contain lubricant, and air circulating means carried by said worm shaft, said outer wall having an inlet opening adjacent said air circulating means and an outlet opening at a point removed from said inlet opening.

GEORGE H. ACKER.